United States Patent [19]

Crist

[11] 4,184,209
[45] Jan. 15, 1980

[54] TOWED NOISEMAKER

[76] Inventor: Ralph P. Crist, 1925 N. Calvert St., Arlington, Va. 22301

[21] Appl. No.: 314,233

[22] Filed: Oct. 10, 1952

[51] Int. Cl.² ............................................. H04B 13/02
[52] U.S. Cl. ......................................... 367/1; 114/245; 114/253; 367/142
[58] Field of Search .................................. 35/25, 10.4; 114/235, 235.1, 235.2, 235.3, 209, 102, 104, 245, 253; 340/407, 2, 3, 4, 5, 50; 272/14; 181/0.51

[56] References Cited
U.S. PATENT DOCUMENTS

| | | | |
|---|---|---|---|
| 1,610,779 | 12/1926 | Hewett | 35/10.4 X |
| 2,151,368 | 3/1939 | Andresen | 114/102 |
| 2,353,360 | 7/1944 | Ronning | 114/235 |
| 2,397,107 | 3/1946 | Hammond | 35/25 |
| 2,403,036 | 7/1946 | Wilcoxon | 114/235.2 |
| 2,709,981 | 6/1955 | Wilcoxon | 114/235.2 |
| 2,710,458 | 6/1955 | Reed | 35/25 |

*Primary Examiner*—Stephen C. Bentley
*Attorney, Agent, or Firm*—R. S. Sciascia; Q. E. Hodges

EXEMPLARY CLAIM

1. A towed decoy system adapted to be towed from a towing vessel, an electrically powered noisemaker, an electrical tow cable attached to said noisemaker, a depressor vane, a depresser cable connected to said depressor vane and to the towing vessel, and means interconnecting said depressor cable and said electrical tow cable at a point near said depressor vane, said interconnecting means comprising a pair of cable grips respectively attached at one end to adjacent sections of said electrical tow cable and at their other ends to a snatch block movably mounted on said depressor cable thereby providing slack in said electrical tow cable, whereby said noisemaker is towed at a depth not less than that of the point of attachment of said snatch block to said depressor cable.

5 Claims, 7 Drawing Figures

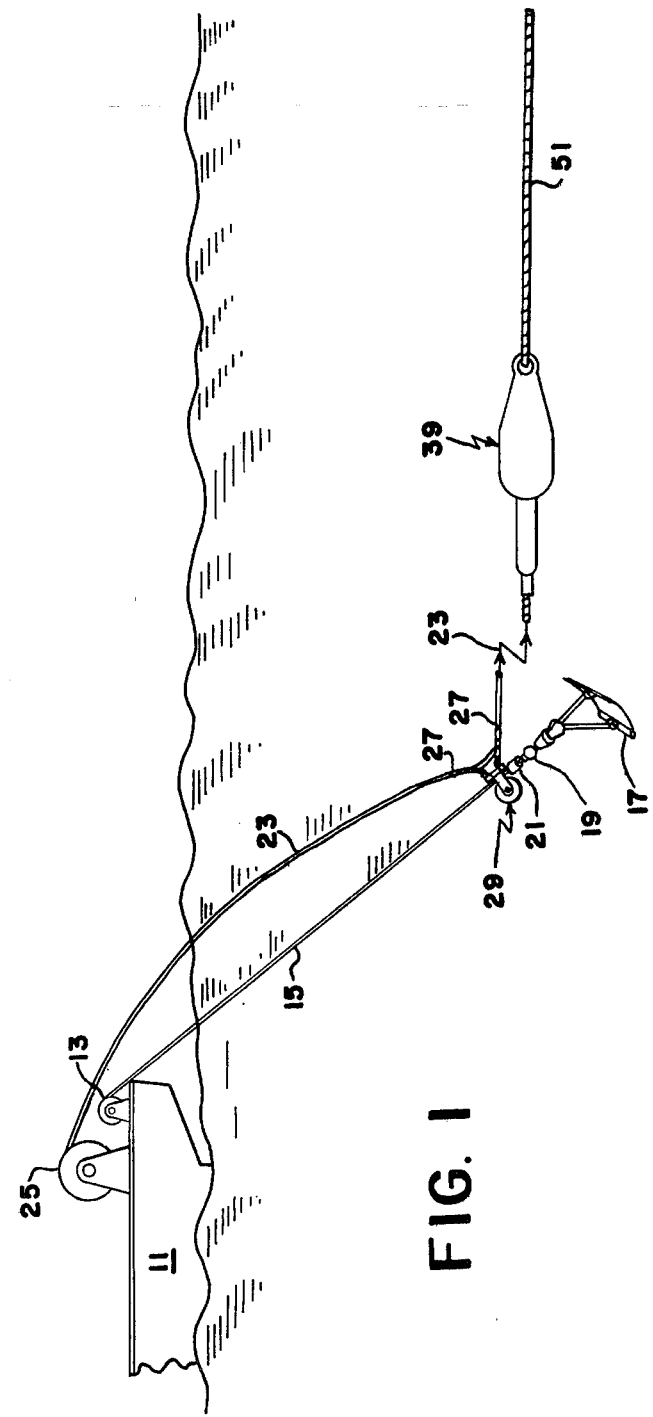

TOWED NOISEMAKER

The invention herein described may be manufactured and used by or for the Government of the United States of America for governmental purposes without the payment of any royalty thereon or therefor.

The present invention relates to a noisemaker and more particularly to a controllable noisemaker which may be towed behind a ship at high speeds.

Modern high-speed ships generally produce noises which are transmitted through the water for long distances and cover a wide range of frequencies. Hydrophone detection of ships and submarines has long been employed by the navies of the world, and homing acoustic torpedoes and mines during the last world war sank increasing numbers of ships. Because it is generally difficult if not impossible to greatly reduce the noise radiated by a ship, other means must be found to confuse an enemy and his homing weapons. One method of accomplishing this deception is to employ noisemakers which produce noises louder than those of the ship at a point remote therefrom and since homing weapons are constructed to direct themselves toward the loudest source of noise, they may bypass the real target for the noisemaker.

Further deception is possible where it is possible to control the sound output of the decoy and to cause it to move from place to place. A noisemaker may be towed from a ship which supplies power to the device and from which the sound output of the device may be started, varied, or stopped at any time, so as to produce the effect of a remote target.

The depth at which a decoy operates must be regulated to indicate an appropriate location of a target. The limits within which the depth of the decoy may vary are not stringent, of course, but must be observed. For example, a decoy operated from a surface ship should be maintained between a depth twice the draft of the vessel and approximately one hundred feet over the range of speed of the ship which may vary from five to thirty-five knots. At high speeds, the drag becomes much larger than the weight of the towed body, so that the body rises to approximately the depth of the towpoint, while at tow speeds it sinks considerably below it. A simple towed body at the end of an approximately six hundred foot line attached to the deck of the towing vessel varied from a depth of one hundred feet at seven knots to three feet at twenty-five knots, which variation is so large as to seriously impair the operation of a noisemaker.

It is frequently necessary that the decoy operate over a period of several hours and even days at a time, and failures at inopportune times may result in the loss of the vessel. Dependability is therefore most important. Since sound is best created by mechanical vibration, a noisemaker is heavily vibrated to such an extent that parts fail within a few minutes unless special precautions are taken. Absorption of vibration of the parts will also reduce the noise output, and cannot be tolerated.

These and many other problems have been overcome in the present invention, in which a separate cable attached to a depressor carries a snatch block which in turn serves at the point of attachment for the noisemaker and may be adjusted to a desired depth below the surface of the water.

It is an object of the present invention to provide a towed noisemaker having a controlled noise output.

It is another object of the present invention to provide a towed noisemaker which will tow at appropriate depths over wide variations in speed.

It is a further object of the present invention to provide a noisemaker having a long useful life.

It is a still further object of the present invention to provide a towed noisemaker towed from a surface vessel by a point of attachment below the surface controllable from the vessel.

Further objects and many of the attendant advantages of the present invention will be made apparent to those skilled in the art by reference to the following detailed description and to the appended drawings in which:

FIG. 1 is a perspective view of the device in operation in the water;

FIG. 7 is a longitudinal cross sectional view, partially broken away, of the noisemaker taken on line VII—VII in FIG. 3.

Figure 6:
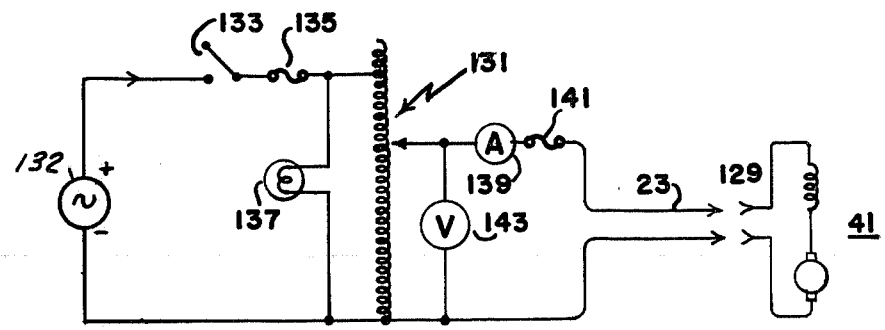
FIG. 6 is a schematic wiring diagram of the present invention.

Referring now to the drawings, wherein the same or corresponding parts are indicated by the same symbol in each of the several views, there is shown in FIG. 1 a towing vessel 11 which is fitted with a winch 13 on which is wound the flexible depressor cable 15. While any desired type of cable may be employed, a suitable cable is airplane cable three-eighths inch in diameter and approximately one hundred feet long.

The depressor vane 17 may be of any desired type, and operates to force the depressor cable downward to maintain a steep cable slope. A suitable device is described in U.S. Pat. No. 2,403,036 to Kenneth H. Wilcoxan et al for Water Kite issued July 2, 1946. The depressor vane 17 is attached to the end of the depressor cable 15, through a swivel 19, and a stop 21 is attached to the cable a short distance, such as five feet above the depressor.

The electric cable 23 is used to tow the device and must be able to withstand considerable stress as well as being submerged in water for a considerable period of time. While the invention is not limited thereto, a suitable cable comprises a pair of insulated electrical conductors covered with two oppositely wound armor sheaths 24 and 26 so as to withstand a large tensile stress without damage to the insulation, and is attached to the drum of the winch 25. A pair of cable grips 27 are attached to the cable 23 in opposite senses so spaced as to provide a few inches of slack when the grips are attached to the snatch block 29. While other types of cable grips are usable, the stocking grip, comprising a plurality of wires woven to form a boot around the cable which tightens on the exterior thereof when the cable is pulled relative to the grips but which may be readily released by compressing the grip, is cheap, easily handled without tools, and does not damage the cable, and therefore highly suited to the present invention.

Figure 2:
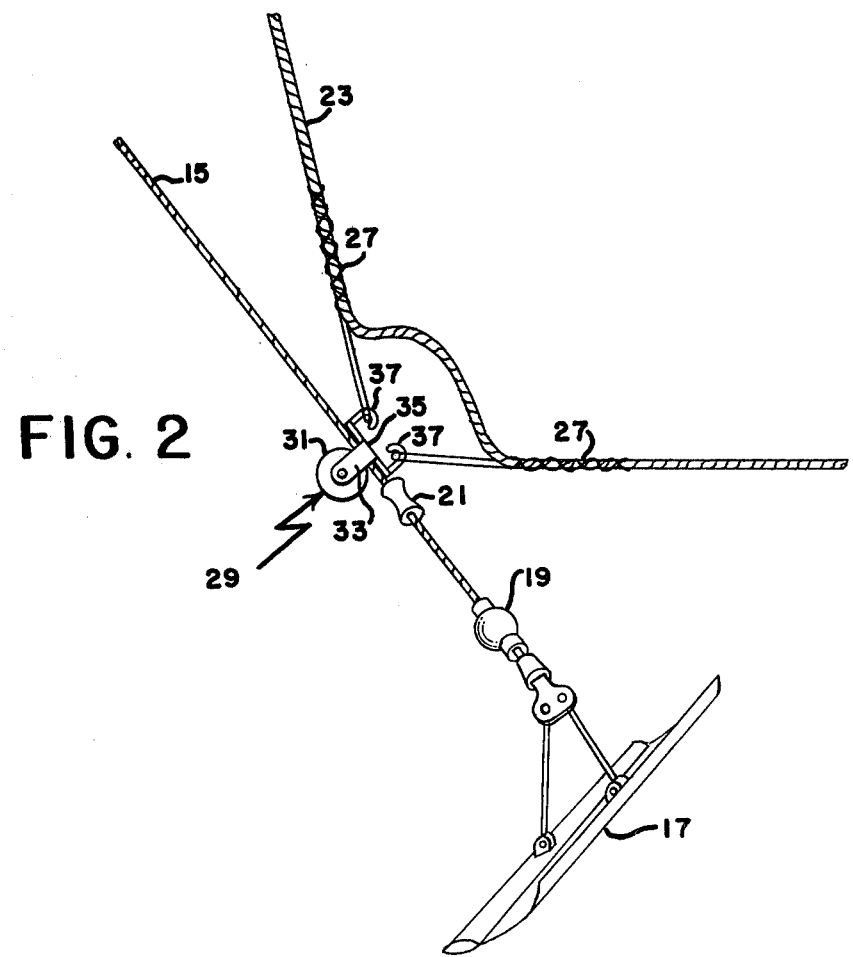
FIG. 2 is a detail view showing the depressor, and attachment of the cable of the noisemaker used in the present invention.

The snatch block 29, best seen in FIG. 2, interconnects the depressor cable 15 and the electric cable 23, and comprises a pulley 31 removably mounted between a pair of guides 33 which are in turn secured to a base 35. Also attached to the base are a pair of hooks 37 adapted to receive the straps of the cable grips 27. The pulley 31 is fitted over the depressor cable 15 so that the pulley 31 may roll along the cable so as to come to rest against the stop 21, a short distance above the depressor 17.

The noisemaker 39 is electrically driven, and the electric cable 23 also serves as a tow line for the unit. The unit is encased in a streamlined housing or casing which supports the equipment, seals the unit from water, and radiates sound energy generated thereby, and comprises three interlocking sections. The main body 49 of the housing or casing is composed of two cylindrical sections in tandem, the tube 77 at the front end containing the noisemaker proper and the barrel 79 at the rear containing the electric motor 41 driving the noisemaker. The nose 53 is removably sealed to the front of the tube 77 and serves to attach the electrical cable to the noisemaker and to seal the conductors from water. The tail 99 serves to close the rear of the barrel 79 and to attach the rope stabilizer 51 to the unit which serves to prevent the noisemaker from whipping about on the end of the electric cable 23.

The noisemaker 39 produces mechanical vibrations in the body by means of a spindle 43 which contains a plurality of toothed rollers 45 which are revolved about the inner surface of the tube 77, thus creating intense vibrations in the tube. The frequency of the sound generated by the rollers 45 is substantially independent of the speed of the rollers, being determined by the physical dimensions of the unit, but the amplitude of the sound is readily varied by changing the speed at which the rollers are driven. Centrifugal force forces the rollers against the surface of the tube 77.

In order to reduce the wear on the inner surface of the tube 77 by the rollers 45, a liner 47 of hardened steel is pressed therein, and the contacting surfaces are lubricated with a tough fibrous grease which also greatly improves the transfer of heat from the rollers 45 to the tube 77.

A variable speed electric motor 41 having a rotary shaft 42 is used to drive the spindle 43. While any desired type of motor may be employed, as illustrated herein, a series type motor capable of operation on alternating current is used because the speed may be readily varied by varying the voltage impressed thereon, and because continuously variable transformers may be used to provide an efficient source of adjustable voltage.

The nose 53 contains a threaded bore 55 at the front end thereof, a threaded bore 57 at the rear thereof, and the cavity 61. The nose plug 63 threadedly engages in the threaded bore 55 and contains a tapered bore 65 which engages a complementary tapered surface on the exterior of the exterior sleeve 67. The exterior sleeve 67 contains a threaded bore adapted to receive the interior sleeve 69 which in turn contains a tapered bore adapted to fit over the wedge 71. The wedge 71 contains a central hole through which the cable 23 passes, the sheaths 24 and 26 of the cable 23 being flared and folded back over the wedge 71 so as to be tightly gripped between the exterior inclined surface of the wedge and the tapered bore in the interior sleeve 69 when the latter is screwed into the exterior sleeve 67. The sleeves 67 and 69 which are thus securely attached to the cable 23 and are fastened to the nose 53 by the nose plug 63 screwing into the threaded bore 55 in the nose 53. The electrical conductors 73 pass through the sleeves and the nose plug into the cavity 61.

The body 40, as previously mentioned, has a cylindrical tube 77 and a barrel 79 having a diameter larger than the tube. The front end of the tube 77 is provided with a threaded neck 81 adapted to screw into the threaded bore 57 of the nose 55, and a counter bore 83 adapted to receive the bulkhead 85. The bulkhead 85 is provided with a groove on its exterior surface to receive the O-ring 87 which seals the bulkhead to the tube 77, and a packing 89 which seals the opening 90 through which the electrical conductors 73 pass.

The tube 77 is fitted with a liner 47 of hardened steel which forms a tight fit inside the tube 77, grooves 91 being provided in the exterior surface of the liner to receive the electrical conductors 73. The front end of the liner 47 contains a receptacle for the bearing 93 which supports one end of the spindle 43.

The barrel 79 contains a cavity 95 adapted to receive the electric motor 41 and is provided at the rear with a threaded bore 97 adapted to receive the tail 99, the tail 99 having an exterior groove for an O-ring 101 which seals the junction of the two parts together. A ring 103 is formed in the rear of the tail to receive the rope 51 previously mentioned.

Figure 4:
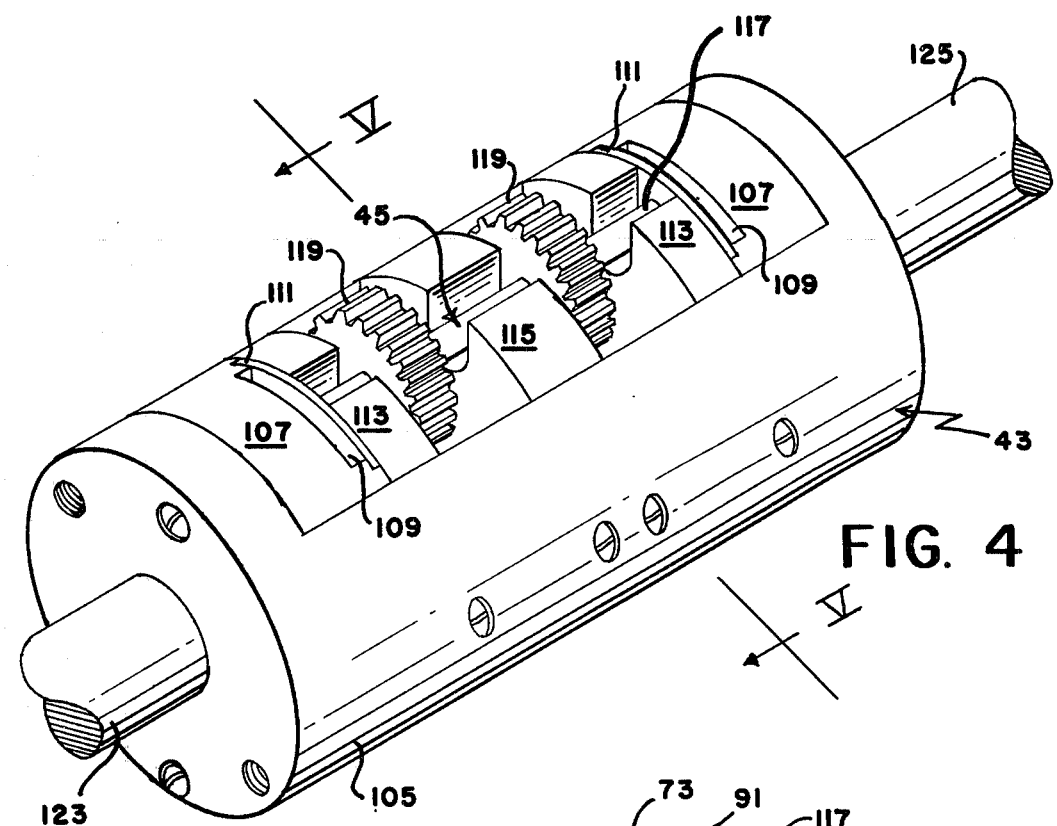
FIG. 4 is a perspective view of the spindle of the noisemaker used in the present invention.
Figure 5:
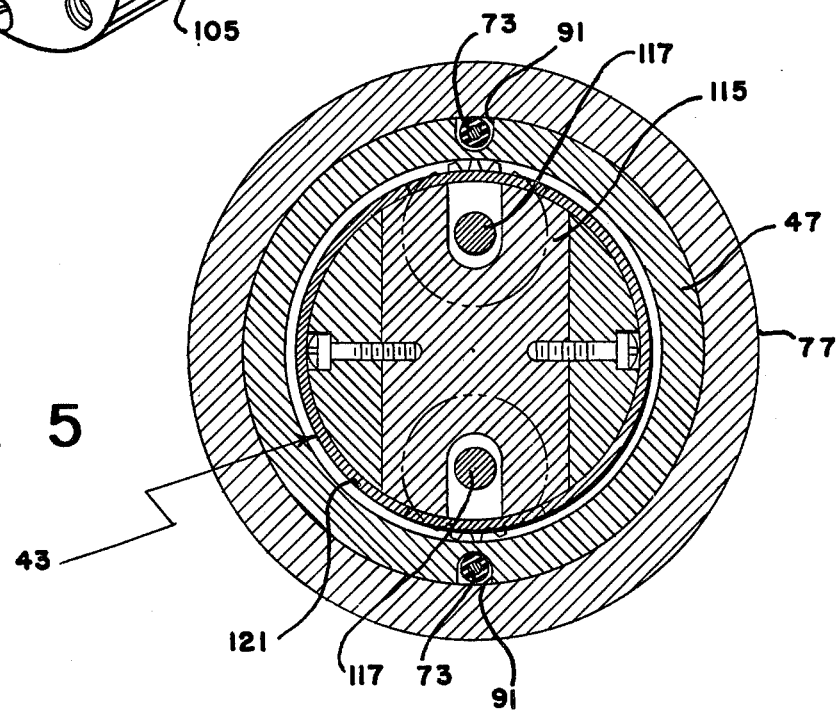
FIG. 5 is a transverse cross section of the noisemaker taken on line V—V in FIG. 3.

As best seen in FIG. 4, the spindle 43 comprises a cylindrical body 105 containing a longitudinal slot therein. Within the slot are secured the end blocks 107 each containing an undercut 109 and shoulders to receive a flat spring 111. End pusher blocks 113 and center pusher block 115 are secured to the sides of the slot to form cradles for the rollers 45.

The rollers 45 are dumb-bell shaped and comprise a shaft 117 having integral flanges 119 thereon having a considerably larger diameter than that of the shaft spaced from respective ends of the shaft and from each other. The outer surfaces of the flanges are toothed, and the pusher blocks 113, 115 contact the shaft on both sides of the flanges 119 to prevent flexing of the shaft, and the flat springs 111 provide resilient end support for the rollers 45. Experience has shown that flexing of the shaft causes considerable breakage of rollers in a few minutes of operation.

Figure 3:
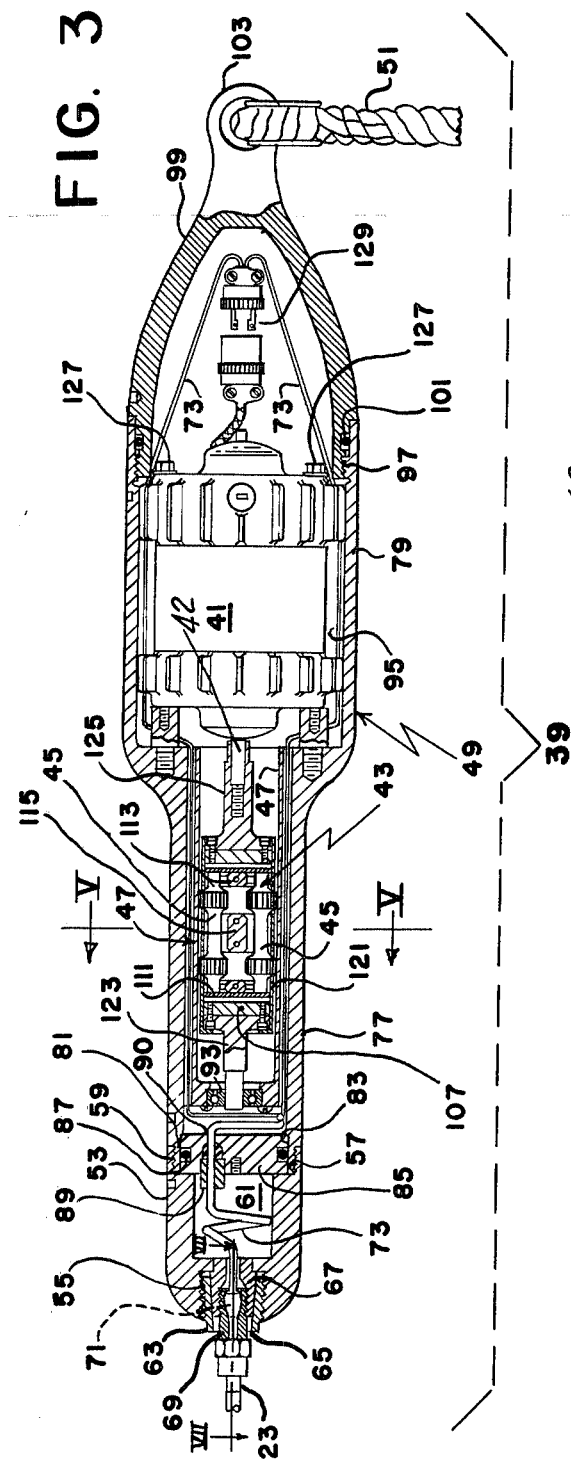
FIG. 3 is a longitudinal cross sectional view of the noisemaker used in the present invention.

The sleeve 121, best seen in FIG. 3, fits over the spindle 43 in any suitable manner, and revolves as an integral part thereof. Its purpose is to reinforce the spindle and to retain grease therein. The spindle 43 is provided with a front shaft extension 123 which is supported in the bulkhead 85 by the bearing 93, and the rear shaft extension 125 which is attached in a conventional manner to the rotary shaft 42 of the motor 41.

The electric motor 41 is secured within the barrel 79 by means of studs 127, the electrical connections between the conductors 73 and the motor 41 being made by means of separable plug 129. Power for the electric motor 41 is supplied from electrical equipment on the towing vessel to the electrical cable 23 and hence the motor 41 through a circuit shown in FIG. 6. The variable transformer 131 adjustable to provide an output of from zero to 270 volts is energized from a source 132 of alternating current on the vessel, such as 230 volts, 60 cycles, through a switch 133 and fuse 135, a pilot 137 being provided to indicate when the circuit is energized. The secondary circuit of the transformer 131 is connected to the electric cable 23 through an ammeter 139 and fuse 141, a voltmeter 143 being connected across the circuit. It will be apparent that the voltmeter 143 measures the voltage supplied to the electrical cable 23 rather than the voltage applied to the electric motor 41, so that correction should be made in the reading thereof to compensate for the voltage drop in the cable 23.

The voltage impressed on the motor 41 is equal to the voltage indicated on the voltmeter 143 reduced by the voltage drop in the cable 23. The impedance of the cable 23 is substantially constant, and the voltage drop is of course equal to the product of the current drawn by the motor 41 and the impedance of the line, so that the proper voltage correction can be readily made. The adjustability of the output of transformer 131 between 0 and 270 volts provides for the application of variable voltage to motor 41 in order to achieve speed regulation of the motor. As indicated above, the result achieved by controlling the motor speed is that the amplitude of sound output from noisemaker 39 can be varied thereby providing a noise source that can be adjusted at will.

The decoy system is put into operation by streaming the depressor 17 from the winch 13 by means of the cable 15, and the noisemaker 39 is streamed from the winch 25 by the cable 23 until the cable grips 27 are exposed. The cable grips 27 are then attached to the snatch block 29 and the snatch block is secured about the cable 15, after which the electric cable 23 is payed out to allow the snatch block to come to rest against the stop 21 on the cable 23. Additional length of cable 23 is payed out to provide slack.

The sound output of the noisemaker 39 is controlled from the adjustable transformer 131, and may be started and stopped by means of either the transformer 131 or the switch 133. In the particular embodiment illustrated herein, the full-load current of the motor 41 is 5 amperes, and the voltage impressed on the cable 23 to provide 115 volts at the motor at a current of 5 amperes is approximately 155 volts.

As an illustration of one embodiment of the invention, the cable 15 has a length of 100 feet, while the electric tow cable has a length of 700 feet with the cable grips 27 attached substantially 550 feet from the noisemaker end of the cable. The electric motor has a rating of ⅛ horsepower at 8000 revolutions per minute, and operates on 115 volts. The diameter of the spindle 43 is approximately 1.5 inches and the diameter of the flanges 119 is approximately 0.7 inches, and FIG. 3 is drawn to scale.

It will be apparent to those skilled in the art that many changes and modifications may be made in the device herein disclosed without departing from the spirit thereof, all such modifications as fall within the limits of the appended claims.

What is claimed is:

1. A towed decoy system adapted to be towed from a towing vessel, an electrically powered noisemaker, an electrical tow cable attached to said noisemaker, a depressor vane, a depressor cable connected to said depressor vane and to the towing vessel, and means interconnecting said depressor cable and said electrical tow cable at a point hear said depressor vane, said interconnecting means comprising a pair of cable grips respectively attached at one end to adjacent sections of said electrical tow cable and at their other ends to a snatch block movably mounted on said depressor cable thereby providing slack in said electrical tow cable, whereby said noisemaker is towed at a depth not less than that of the point of attachment of said snatch block to said depressor cable.

2. An underwater decoy adapted to be towed from a vessel comprising a cylindrical spindle, a plurality of rollers each having a serrated circumferential surface, means securing said plurality of rollers to said spindle in equiangular positions with a portion of each of said serrated circumferential surfaces projecting from said spindle, a cylindrical casing surrounding said spindle having its inner surface contacting said circumferential surfaces of said rollers, and its exterior surface in contact with water, an electric motor having a rotary shaft connected to said spindle, an armored cable comprising electrical conductors connected to said electric motor, mechanical means connecting said armor to the towing vessel and a source of electric power connected to said electrical conductors.

3. The combination as claimed in claim 2 which includes means for controlling the speed of the electric motor.

4. In an underwater electric decoy to be towed from a vessel, a cylindrical casing having its outer surface in contact with the water, a cylindrical spindle therein, said spindle comprising a plurality of rollers each comprising a shaft carrying two serrated flanges thereon spaced from each other and the respective ends of the shaft and contacting the inner surface of said casing, pusher means interconnecting said spindle and said rollers in equiangular eccentric positions with respect to the axis of said spindle, said pusher means contacting said shaft on either side of each of said flanges, an electric motor having a rotary shaft connected to said spindle, and a source of electric power connected to said motor.

5. In an electrical underwater decoy, a cylindrical casing having its outer surface in contact with the water, a cylindrical spindle within said casing including a plurality of rollers equiangularly disposed in positions eccentric to the axis of said spindle and contacting said casing, each of said rollers comprising a shaft having thereon a plurality of serrated flanges spaced from each other and the ends of the shaft, pusher means for said rollers secured to said spindle and contacting the shaft of each of said rollers on both sides of the flanges thereon, an electric motor secured to said casing and having a rotary shaft connected to said spindle, a cable comprising electrical conductors having one end secured to said casing and electrically connected to said electric motor, means for securing said cable to the towing vessel, a source of electric power connected to said cable, and means for controlling the speed of said electric motor.

* * * * *